United States Patent Office 3,814,758
Patented June 4, 1974

3,814,758
NITROFURYL PYRIMIDINE DERIVATIVES
Rudolf Albrecht, Hans-Joachim Kessler, and Eberhard Schröder, Berlin, Germany, assignors to Schering Aktiengesellschaft, Berlin, Germany
No Drawing. Filed Aug. 12, 1970, Ser. No. 63,336
Claims priority, application Germany, Aug. 13, 1969, P 19 41 575.9
Int. Cl. C07d 51/38
U.S. Cl. 260—251 R          8 Claims

ABSTRACT OF THE DISCLOSURE

Nitrofuryl-pyrimidines of the formula

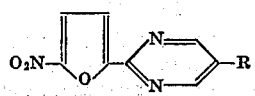

wherein R is an alkyl or alkoxy group substituted by an hydroxy group esterified by an N-alkylcarbamic acid; a monoester of carbonic acid, an alkylsulfonic acid, benzenesulfonic acid or toluenesulfonic acid, are active against *Trichomonas vaginalis*.

BACKGROUND OF THE INVENTION

This invention relates to novel nitrofuryl-pyrimidines. Belgian Pat. No. 716,946 and the prior filed application of Klaus Gutsche et al., Ser. No. 739,171, filed June 24, 1968, now U.S. Pat. 3,632,584, relate to compounds of the formula

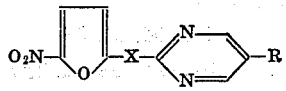

wherein R represents, inter alia, an alkyl or alkoxy group of 1–6 carbon atoms, optionally substituted by hydroxy or alkanoyloxy, X represents a monovalent carbon to carbon bond or —CH=CY— wherein Y is hydrogen, lower-alkyl, aryl or aralkyl. These compounds exhibit high antimicrobial effects, especially against *Trichomonas vaginalis*.

It has now been found that the compounds of this invention exhibit an even higher activity against trichomonads than those of the Belgian patent.

SUMMARY OF THE INVENTION

This invention relates to compounds of the formula

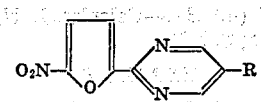

I wherein R is an alkyl or alkoxy group of 1–6 carbon atoms substituted by a hydroxy group esterified with an N-alkylcarbamic acid of 2–7 carbon atoms, a monoester of carbonic acid of 2–7 carbon atoms, an alkylsulfonic acid of 1–6 carbon atoms, benzenesulfonic acid, or toluenesulfonic acid.

DETAILED DISCUSSION OF THE INVENTION

Compounds of this invention wherein X is

—CH=CY— include those wherein Y is methyl, ethyl, propyl, isopropyl, butyl, octyl or other straight and branched chain alkyl of 1–8 carbon atoms; phenyl, p-tolyl, sym.-xylyl, naphthyl, 2,4,5,6-tetrahydronaphthyl, benzyl, phenethyl, and other aryl, preferably of 6 to 10 carbon atoms and other aralkyl of 7 to 12 carbon atoms.

Compounds of this invention wherein R is an alkyl group substituted with a hydroxy group esterified as described herein include those wherein the alkyl group is ethyl, propyl, isopropyl, butyl, amyl, and other alkyl groups substituted, preferably in the β or terminal carbon atom with the esterified hydroxy group, especially β-substituted ethyl and γ-substituted propyl.

Compounds of this invention wherein R is an alkoxy group substituted with a hydroxy group esterified as described herein include those wherein the alkoxy group is ethoxy, propoxy, isopropoxy, butoxy, amyloxy and other alkoxy groups substituted, preferably on the β or terminal carbon with the esterified hydroxy group, especially β-substituted ethoxy and γ-substituted propoxy.

Compounds of this invention wherein R is an alkyl or alkoxy group containing a bridging oxygen atom include 2-ethoxy-ethoxy, 3-ethoxy-propoxy, 3-propoxy-propoxy, 2-ethoxy-ethyl, 3-ethoxy-propyl and 3-propoxy-propyl wherein the terminal carbon atom bears an esterified hydroxy group as defined herein.

The esterified hydroxy group can be an ester of an alkyl carbonic acid, an N-alkyl-carbamic acid, an alkylsulfonic acid, p-toluenesulfonic acid or benzenesulfonic acid, i.e., an alkoxy-carbonyloxy, alkylsulfonyloxy, alkylaminocarbonyloxy or dialkylaminocarbonyloxy group.

Although this invention is directed primarily to compounds of Formula I wherein R is an esterified hydroxy substituted alkyl or alkoxy group as defined herein, other such compounds having trichomonadial activity are those otherwise corresponding to Formula I wherein the hydroxy group is esterified with another carbamic, carbonic or sulfonic acid, e.g., carbamic acid, N-propylcarbamic, N-butylcarbamic, dimethylcarbamic, diethylcarbamic, di-n-propylcarbamic, N - methyl-N-propylcarbamic acid, m,m'-dimethylbenzenesulfonic, o,o'-dimethylbenzenesulfonic, sym.-trimethylbenzenesulfonic, sym.-triethylbenzenesulfonic, m-ethylbenzenesulfonic, para-isopropylbenzenesulfonic, m-n-butylbenzenesulfonic, or is alkylsulfonyl, e.g., propanesulfonic, isopropanesulfonic, butanesulfonic, tert.-butanesulfonic, pentanesulfonic, isopentanesulfonic, hexanesulfonic, heptanesulfonic, octylsulfonic or heterocyclic sulfonic acid, e.g., α-pyridenesulfonic, α-pyranesulfonic, α-thiophenesulfonic, α-furansulfonic, α-tetrahydrofuransulfonic, or other alkyl-, carbocyclic and heterocyclic aryl-, alkaryl- and aralkyl-sulfonic acid, preferably one containing 1–8 carbon atoms and 0–2, preferably 0.1 N, S or O hetero atoms, which are preferably ring carbon atoms, in the heterocyclic ring.

The novel compounds can be prepared by reacting in a conventional manner the corresponding free hydroxy compounds, obtainable in accordance with Belgian Pat. No. 716,946, with an alkyl isocyanate, an ester of chlorocarbonic acid or an alkylsulfonyl, benzenesulfonyl or p-toluenesulfonyl chloride.

The novel compounds exhibit a very high effect against trichomonads. The following table demonstrates their higher activity against *Trichomonas vaginalis*, compared to 1-β-(hydroxyethyl) - 2 - methyl - 5 - nitroimidazole-(metronidazole) and 2-(5-nitro-2-furyl) - 5 - n - butoxy-pyrimidine, a compound of Belgian Pat. No. 716,946.

TABLE I

| Compound: | MIC[1] against *Trichomonas vaginalis* (µg./ml.) |
|---|---|
| (A) 1-β-(hydroxyethyl) - 2 - methyl-5-nitroimidazole | 1.56 |
| (B) 2-(5-nitro-2-furyl) - 5 - n - butoxypyrimidine | 1.56 |
| (1) 2-(5-nitro-2-furyl)-5-(2-methoxycarbonyloxyethoxy)-pyrimidine | 0.19 |
| (2) 2-(5-nitro-2-furyl)-5-(2-methanesulfonyloxyethoxy)-pyrimidine | 0.19 |
| (3) 2-(5-nitro-2-furyl)-5-(2-p-toluenesulfonyloxyethoxy)-pyrimidine | 0.19 |
| (4) 2-(5-nitro-2-furyl)-5-(2 - methylaminocarbonyloxyethoxy)-pyrimidine | 0.098 |

[1] Minimum inhibitory concentration.

The compounds of this invention can be administered in the forms customarily employed in pharmaceuticals. For oral administration, especially suitable are tablets, dragées, capsules, pills, suspensions and solutions. Suitable excipients for tablets are, for example, lactose, amylose, talc, gelatin, magnesium stearate, etc.

For topical administration, suitable are powders, solutions, suspensions, aerosols, and vaginal suppositories. For parenteral application, aqueous and oily solutions or suspensions can be employed.

The compounds of this invention are formulated so as to provide, for example, 0.1–0.5 g. of the effective agent in admixture with 0.1 to 5 g. of a pharmacologically indifferent excipient, i.e., a pharmaceutically acceptable carrier, per unit dosage, e.g., per tablet.

The novel effective agents are usually administered in amounts of between 0.1 and 2.0 g. per patient per day.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

2-(5-nitro-2-furyl)-5-(2-methoxycarbonyloxyethoxy)-pyrimidine 502 mg. of 2-(5-nitro-2-furyl)-5-(2-hydroxyethoxy)-pyrimidine and 442 mg. of the methyl ester of chlorocarbonic acid are agitated in 5 ml. of pyridine for 3 hours at room temperature; then, the reaction mixture is poured into water, and the solid product is recrystallized from ethanol/methyl glycol and dried at 70° C. under vacuum. Yield: 445 mg., M.P. 161–162° C.

$C_{12}H_{11}N_3O_7$ (309.2).—Calculated: N, 13.60. Found: N, 13.57.

EXAMPLE 2

2-(5-nitro-2-furyl)-5-(2-ethoxycarbonyloxyethoxy)-pyridine

This compound is produced analogously to Example 1 from 502 mg. of 2-(5-nitro-2-furyl)-5-(2-hydroxy-ethoxy)-pyrimidine and 124 mg. of the ethyl ester of chlorocarbonic acid. Yield: 365 mg., M.P. 133° C.

$C_{13}H_{13}N_3O_7$ (323.3).—Calculated: N, 12.92. Found: N, 12.93.

EXAMPLE 3

2-(5-nitro-2-furyl)-5-(3-methoxycarbonyloxy-n-propyl)-pyrimidine

The compound is prepared analogously to Example 1 from 498 mg. of 2-(5-nitro-2-furyl) - 5 - (3-hydroxy-n-propyl)-pyrimidine and 552 mg. of the methyl ester of chlorocarbonic acid. The product is recrystallized from ethanol. Yield: 320 mg., M.P. 128–132° C.

$C_{13}H_{13}N_3O_6$ (307.2).—Calculated: N, 13.68. Found: N, 13.64.

EXAMPLE 4

2-(5-nitro-2-furyl)-5-(3-ethoxycarbonyloxy-n-propyl)-pyrimidine

This compound is produced analogously to Example 1 from 498 mg. of 2-(5-nitro-2-furyl) - 5 - (3-hydroxy-n-propyl)-pyrimidine and 623 mg. of the ethyl ester of chlorocarbonic acid. The product is recrystallized from ethanol. Yield: 430 mg., M.P. 96–100° C.

$C_{14}H_{15}N_3O_6$ (321.2).—Calculated: N, 13.19. Found: N, 13.02.

EXAMPLE 5

2-(5-nitro-2-furyl)-5-(2-methanesulfonyloxyethoxy)-pyrimidine

This compound is prepared analogously to Example 1 from 502 mg. of 2-(5-nitro-2-furyl)-5-(2-hydroxyethoxy)-pyrimidine and 488 mg. of methanesulfonic acid chloride. The product is recrystallized from ethanol. Yield: 320 mg., M.P. 148–149° C.

$C_{11}H_{11}N_3O_7S$ (329.3).—Calculated: N, 12.39; S, 9.44. Found: N, 12.79; S, 9.64.

EXAMPLE 6

2-(5-nitro-2-furyl)-5-(3-methanesulfonyloxy-n-propyl)-pyrimidine

This compound is produced analogously to Example 1 from 498 mg. of 2 - (5-nitro-2-furyl)-5-(3-hydroxy-n-propyl)-pyrimidine and 488 mg. of methanesulfonic acid chloride. The reaction product is recrystallized from ethanol/methyl glycol 3:1. Yield: 430 mg., M.P. 156–159° C.

$C_{12}H_{13}N_3O_6S$ (327.3).—Calculated: N, 12.84; S, 9.78. Found: N, 12.95; S, 9.30.

EXAMPLE 7

2-(5-nitro-2-furyl)-5-(2-p-toluenesulfonyloxyethoxy)-pyrimidine

This compound is prepared analogously to Example 1 from 2.51 g. of 2-(5-nitro-2-furyl)-5-(2-hydroxyethoxy)-pyrimidine and 3.83 g. of p-toluenesulfonyl chloride. The product is recrystallized from ethanol/methyl glycol 4:1. Yield: 2.50 g., M.P. 149–151° C.

EXAMPLE 8

2-(5-nitro-2-furyl)-5-(3-p-toluenesulfonyloxy-n-propyl)-pyrimidine

This compound is produced analogously to Example 1 from 498 mg. of 2-(5-nitro-2-furyl)-5-(3-hydroxy-n-propyl)-pyrimidine and 764 mg. of p-toluenesulfonyl chloride. The product is recrystallized from ethanol. Yield: 340 mg., M.P. 132–134.5° C.

$C_{18}H_{17}N_3O_6S$ (403.3).—Calculated: N, 10.41; S, 7.95. Found: N, 10.55; S, 7.91.

EXAMPLE 9

2-(5-nitro-2-furyl)-5-(2-methylaminocarbonyloxyethoxy)-pyrimidine 502 mg. of 2 - (5-nitro-2-furyl)-5-(2-hydroxyethoxy)-pyrimidine and 236 mg. of methyl isocyanate are agitated in 20 ml. of absolute dioxane in the presence of one drop of triethylamine for 24 hours at 50° C.; then, the reaction mixture is evaporated and the residue recrystallized from ethanol/methyl glycol. Yield: 344 mg., M.P. 186–188° C.

$C_{12}H_{12}N_4O_6$ (308.4).—Calculated: N, 18.19. Found: N, 17.85.

EXAMPLE 10

2-(5-nitro-2-furyl)-5-(2-ethylaminocarbonyloxyethoxy)-pyrimidine

This compound is produced analogously to Example 9 from 502 mg. of 2-(5-nitro-2-furyl)-5-(2-hydroxyethoxy)-pyrimidine and 284 mg. of ethyl isocyanate. The product is recrystallized from ethanol. Yield: 437 mg., M.P. 151–153° C.

$C_{13}H_{14}N_4O_6$ (322.4).—Calculated: N, 17.40. Found: N, 16.99.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

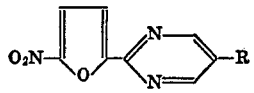

wherein R is —O—Alk—R″ or —Alk—R″ in which R″ is a hydroxy group esterified with an N-alkylcarbamic acid of 2–7 carbon atoms and Alk is alkylene of 1–6 carbon atoms.

2. A compound of the formula

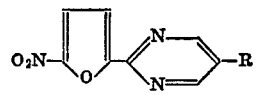

wherein R is —O—Alk—R″ or —Alk—R″ in which R″ is a hydroxy group esterified with a monoalkyl ester of carbonic acid of 2–7 carbon atoms and Alk is alkylene of 1–6 carbon atoms.

3. A compound of claim 1, 2-(5-nitro-2-furyl)-5-(2-methylaminocarbonyloxyethoxy)-pyrimidine.

4. A compound of claim 1, 2-(5-nitro-2-furyl)-5-(2-ethylaminocarbonyloxyethoxy)-pyrimidine.

5. A compound of claim 2, 2 - (5-nitro-2-furyl)-5-(2-methoxycarbonyloxyethoxy)-pyrimidine.

6. A compound of claim 2, 2 - (5-nitro-2-furyl)-5-(2-ethoxycarbonyloxyethoxy)-pyrimidine.

7. A compound of claim 2, 2 - (5-nitro-2-furyl)-5-(3-methoxycarbonyloxy-n-propyl)-pyrimidine.

8. A compound of claim 2, 2 - (5-nitro-2-furyl)-5-(3-ethoxycarbonyloxy-n-propyl)-pyrimidine.

References Cited
UNITED STATES PATENTS 3,359,262　12/1967　Takamatsu et al. _____ 260—240
3,632,584　1/1972　Gutsche et al. _____ 260—251

NICHOLAS S. RIZZO, Primary Examiner

R. V. RUSH, Assistant Examiner

U.S. Cl. X.R.

260—240 A, 256.4 R, 256.4 C; 424—251